United States Patent [19]

Hamburger

[11] 4,391,591
[45] * Jul. 5, 1983

[54] COMBINED PATTERN HOLDER AND PATTERN POSITION INDICATOR

[76] Inventor: Manny C. Hamburger, 2233 Oregon Ct., St. Louis Park, Minn. 55426

[*] Notice: The portion of the term of this patent subsequent to Nov. 24, 1998, has been disclaimed.

[21] Appl. No.: 321,980

[22] Filed: Nov. 16, 1981

Related U.S. Application Data

[63] Continuation of Ser. No. 88,795, Oct. 29, 1979, Pat. No. 4,302,192.

[51] Int. Cl.³ .............................................. G09B 19/20
[52] U.S. Cl. .................................................... 434/95
[58] Field of Search ............................ 35/15, 27, 31 E; 116/235, 240, 236, 325; 235/61 B, 70 B, 90; 282/29 A, 29 B; 434/95; 40/352

[56] References Cited

U.S. PATENT DOCUMENTS

| | | | |
|---|---|---|---|
| 139,936 | 6/1873 | Ward | 116/235 |
| 2,301,410 | 11/1942 | Kaplan | 434/95 |
| 2,311,052 | 2/1943 | Hurup | 282/29 A |
| 2,449,810 | 9/1948 | Guenther | 33/184.6 |
| 2,456,676 | 12/1948 | Chowns | 235/70 R X |
| 3,021,615 | 2/1962 | Ostroff | 434/373 |
| 3,139,687 | 7/1964 | Hamer | 116/325 X |
| 4,024,662 | 5/1977 | Krulwich | 40/352 |

FOREIGN PATENT DOCUMENTS 2179 of 1907 United Kingdom ................. 235/90

Primary Examiner—Harland S. Skogquist
Attorney, Agent, or Firm—Wicks & Nemer

[57] ABSTRACT

A device is shown in the preferred embodiment of the present invention for holding a knitting pattern and for indicating the pattern position. The pattern is held to a pattern support face of a pattern support member by a clip member. The pattern position is recorded and visually summarized at a single location by a single notation member. Specifically, the notation member includes an elongated bar member movably mounted on the pattern support member for visually underscoring the row of the pattern. Further, and simultaneously, the notation member includes members for indicating other pattern information, shown in a first preferred form as indicators slidably mounted in grooves formed in the elongated bar member and in a second preferred form as pegs receivable in apertures formed in the elongated bar member which indicate the pattern position by indicating numerals forming a pattern position guide.

6 Claims, 6 Drawing Figures

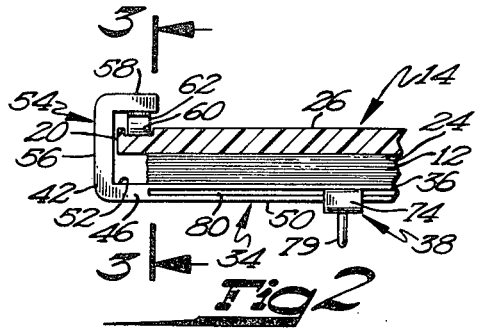
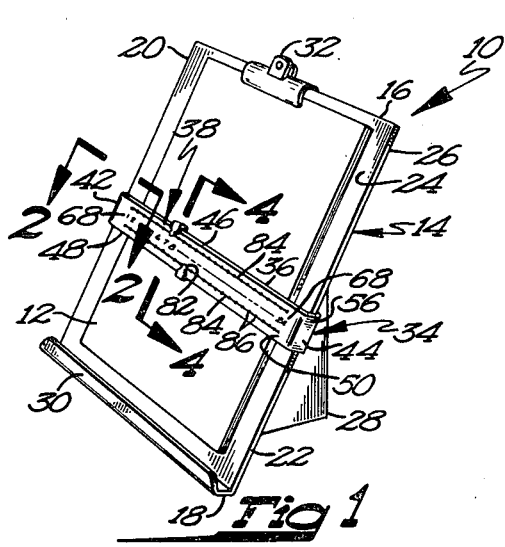
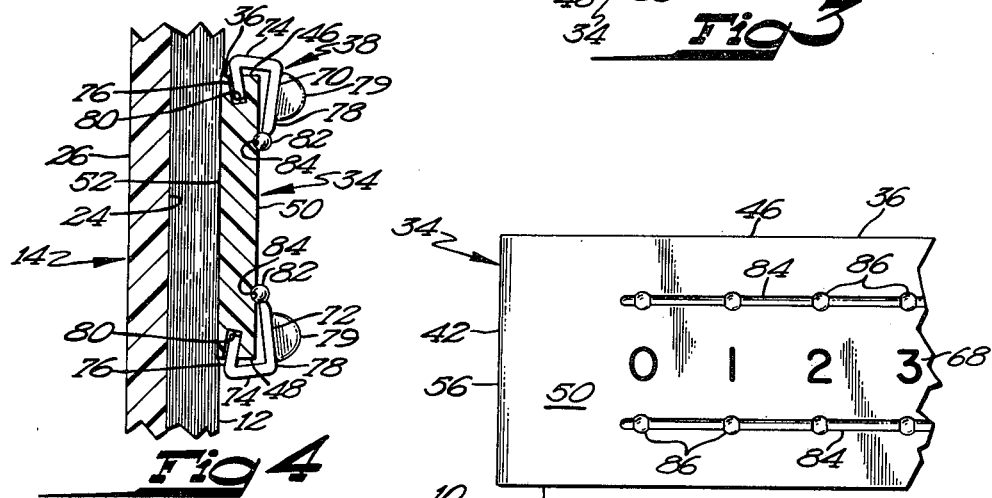
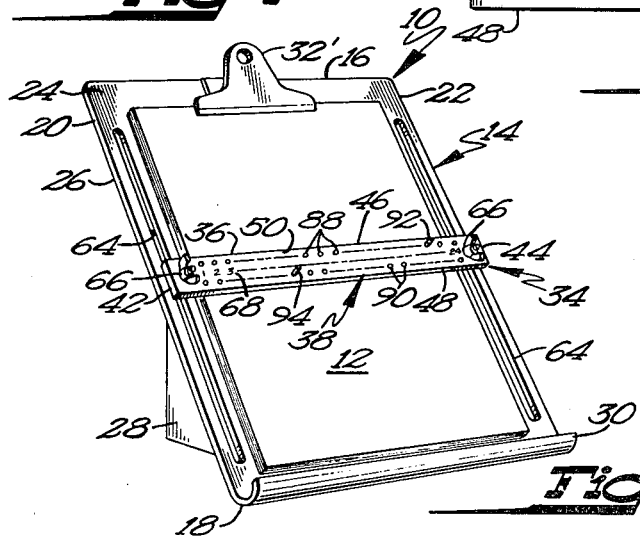

COMBINED PATTERN HOLDER AND PATTERN POSITION INDICATOR

CROSS REFERENCE

This is a continuation of application Ser. No. 088,795 filed Oct. 29, 1979 by the same applicant, now U.S. Pat. No. 4,302,192.

BACKGROUND

The present invention relates generally to a pattern holder, and more particularly, to a combined pattern holder and pattern position indicator.

With the increasing amounts of tension created by modern society and with the increasing amounts of leisure time available to persons in modern society, an increasing need has been felt for hobbies or other activities which act as therapy in releasing such tension and which occupy such free time. One such activity which is within this select class is knitting, which not only meets this need but is also very productive and self-gratifying.

Knitting patterns are often very complex and therefore it is often easy to get lost in the pattern by unknowingly skipping to wrong rows or other pattern positions. This skipping causes double work as the incorrect knitting as well as any other knitting that follows the incorrect portion must be unravelled and corrected. This is very frustrating to the knitter and may occur frequently. Thus, many people, especially persons just beginning to knit, become very frustrated in trying to knit, and specifically in trying to follow patterns, and often discontinue knitting altogether because thereof.

Thus, a need has arisen for a device which allows a knitter to quickly and easily determine and maintain his/her pattern position.

SUMMARY

The apparatus of the present invention solves these and other problems by providing, in the preferred embodiment, a device for simultaneously holding a pattern and indicating the pattern position. Specifically, the device includes a pattern support member having a pattern support face allowing the support of the pattern thereon. A member is provided for holding the pattern on the support face of the pattern support member. A notation member for delineating the pattern position is provided including a member for visually highlighting the row of the pattern being knitted and simultaneously also including members located on the visually highlighting member for indicating other pattern information.

It is thus a primary object of the present invention to provide a novel device for simultaneously holding a pattern and indicating pattern information.

It is a further object of the present invention to provide such a novel device for holding a pattern and indicating pattern position which records and visually summarizes the pattern position at a single location by a single notation member.

It is a further object of the present invention to provide such a novel device for holding a pattern and indicating pattern position which allows a user to quickly and easily determine the pattern position.

It is a further object of the present invention to provide such a novel device for holding a pattern and indicating pattern position which is small in size, easy to carry, and light in weight.

These and further objects and advantages of the present invention will become clearer in the light of the following detailed description of illustrative embodiments of this invention described in connection with the drawings.

DESCRIPTION OF THE DRAWINGS

The illustrative embodiments may best be described by reference to the accompanying drawings where:

FIG. 1 shows a perspective view of a device for holding a pattern and indicating pattern position according to the teachings of the present invention.

FIG. 2 shows a sectional view of the device of FIG. 1 according to section line 2—2 of FIG. 1.

FIG. 3 shows a sectional view of the device of FIG. 1 according to section line 3—3 of FIG. 2.

FIG. 4 shows a sectional view of the device of FIG. 1 according to section line 4—4 of FIG. 1.

FIG. 5 shows a partial front view of the device of FIG. 1.

FIG. 6 shows a perspective view of an alternate embodiment of the device of FIG. 1.

All figures are drawn for ease of explanation of the basic teachings of the present invention only; the extensions of the figures with respect to number, position, relationships, and dimensions of the parts to form preferred embodiments will be explained or will be obvious once the explanation is read and understood.

Where used in the various figures of the drawings, the same numerals designate the same or similar parts in the various figures. Furthermore, when the terms "first", "second," "top," "bottom," "side," "front," "vertical," and similar terms are used herein, it should be understood that these terms have reference only to the structure shown in the drawings, as it would appear to a person viewing the drawings, and are utilized only to facilitate describing the invention.

DESCRIPTION

The remaining disclosure of the present invention, including preferred embodiments, are incorporated herein by reference to application Ser. No. 088,795 filed Oct. 29, 1979, by Manny C. Hamburger entitled "Combined Pattern Holder and Pattern Position Indicator," now U.S. Pat. No. 4,302,192, the parent application of the present application.

What is claimed is:

1. A device for simultaneously holding a pattern to be followed and indicating pattern information, with the pattern to be followed including several rows, with each of the rows including a plurality of instructions for performing various stitches, comprising, in combination: a pattern support member including a top edge, a bottom edge, a first side edge, a second side edge, a pattern support face, and a back face, with the pattern support face allowing the support of the pattern to be followed thereon; means for holding the pattern to be followed on the pattern support face of the pattern support member; and notation means for simultaneously delineating and also for visually summarizing the pattern position in the pattern to be followed at a single visual location, with the notation means comprising, in combination: means for visually highlighting the row of the pattern to be followed and means located on the visually highlighting means for indicating the position of the pattern to be followed, with the visually highlighting means being movable upon the pattern support face of the pattern support member in a direction generally parallel to the side edges and between the top and bottom edges, wherein the visually highlighting means comprises an elongated bar member having a first end, a second end, a top edge, a bottom edge, a first face, and a second face, wherein the pattern position indicating means comprises, in combination: a series of pattern positions located on the first face of the elongated bar member; a first indicator; a second indicator; means for independently operating the first and second indicators allowing the first and second indicators to indicate the same pattern position at the same time in the series of pattern positions or different pattern positions at the same time in the series of pattern positions and allowing the first and second indicators to be moved from any pattern position to any other pattern position without interfering with or requiring movement of the other indicator, with the independently operating means comprising: means located on and cooperating with the elongated member for positioning the first indicator adjacent the top edge of the elongated member for indicating the desired pattern position in the series of pattern positions, and means located on and cooperating with the elongated bar member for positioning the second indicator adjacent the bottom edge of the elongated member for indicating the desired pattern position in the series of pattern positions.

2. The device of claim 1 wherein the means for positioning the first indicator comprises means for slideably mounting the first indicator on the elongated member for slideable movement along the top edge and between the first and second ends of the elongated bar member and wherein the means for positioning the second indicator comprises means for slidably mounting the second indicator on the elongated member for slideable movement along the bottom edge and between the first and second ends of the elongated bar member.

3. The device of claim 1 or 2 wherein the elongated bar member is movably mounted upon the pattern support face of the pattern support member by first and second L-shaped members attached to the first and second ends of the elongated bar member and including a first leg attached to the end of the bar member which extends adjacent and parallel to the side edge of the pattern support member and a second leg attached to the first leg which extends adjacent the back face of the pattern support member.

4. The device of claim 1 wherein the pattern support member includes slots formed through the faces of the pattern support member adjacent and parallel to but spaced from the side edges which extend between but are spaced from the top and bottom edges of the pattern support member; and wherein the elongated bar member is movably mounted to the pattern support member by bolts which extend through the elongated bar member and the slots formed in the pattern support member which are slidable and movable along and in the slots.

5. The device of claim 1 or 4 wherein the first indicator comprises, in combination: a first series of apertures formed in the first face of the elongated bar member, with each of the apertures being associated with a pattern position; and a first peg for insertion into the apertures for indicating the desired pattern position, and wherein the second indicator comprises, in combination: a second series of apertures formed in the first face of the elongated bar member, with each of the apertures being associated with a pattern position; and a second peg for insertion into the apertures for indicating the desired pattern position.

6. The device of claim 5 wherein the series of pattern positions comprises a series of numerals located on the first face of the elongated bar member.

* * * * *